(12) United States Patent
Nguyen et al.

(10) Patent No.: US 7,046,970 B2
(45) Date of Patent: May 16, 2006

(54) SYSTEM AND METHOD OF PHASE MODULATION CONTROL IN RF SIGNAL GENERATION

(75) Inventors: Cong Nguyen, Durham, NC (US); Randy Bright, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 876 days.

(21) Appl. No.: 09/962,691

(22) Filed: Sep. 25, 2001

(65) Prior Publication Data

US 2003/0060174 A1 Mar. 27, 2003

(51) Int. Cl.
*H04B 1/04* (2006.01)
(52) U.S. Cl. ...................... 455/110; 455/102; 455/108; 375/302
(58) Field of Classification Search .................. 455/91, 455/102, 108–110, 113, 114.2, 119, 121–123, 455/127.4; 375/146, 149, 260, 261, 268, 375/274, 275, 295, 300, 302, 315
See application file for complete search history.

(56) References Cited

U.S. PATENT DOCUMENTS 5,748,682 A 5/1998 Mobin

*Primary Examiner*—Melur Ramakrishnaiah
(74) *Attorney, Agent, or Firm*—Coats & Bennett, P.L.L.C.

(57) ABSTRACT

Phase modulation control techniques and supporting apparatus avoid phase discontinuity at the outset of RF signal generation. Such discontinuities might arise from phase control instabilities associated with transmit start up or from abrupt changes in phase at the beginning of transmit signal generation. A transmitter uses starting phase values in advance of transmit data phase values to initialize phase modulation control circuits or functions. Once phase control is stabilized, and possibly after other criteria are met, the transmitter transitions from using the starting phase values to using the transmit data phase values, so that a transmit signal begins carrying phase modulations associated with the desired transmit data. The phase modulation control techniques described herein apply where transmitters employ direct phase modulation in RF signal generation, and may have particular applicability to burst-type RF transmitters, such as a transmitter employing direct modulation of amplitude and phase in an EDGE communication system.

34 Claims, 11 Drawing Sheets

| 3 TAIL SYMBOLS | 57 DATA SYMBOLS | 1 STEALING FLAG SYMBOL | 26 TRAINING SYMBOLS | 1 STEALING FLAG SYMBOL | 57 DATA SYMBOLS | 3 TAIL SYMBOLS |

SYSTEM AND METHOD OF PHASE MODULATION CONTROL IN RF SIGNAL GENERATION

BACKGROUND OF THE INVENTION

The present invention generally relates to radio frequency transmitters, and particularly relates to improving performance in transmitters employing direct modulation of amplitude and phase.

Communication systems represent a complex balance of competing interests. Today's modern digital wireless communication systems stand as dramatic testimony to the increasing complexity and intricate blending of solutions required to field reliable, high performance voice and data communication systems. Engineers must balance requirements of bandwidth and power efficiency against signal fidelity and linearity requirements, all while meeting increasingly strict power and interference requirements.

For example, the need to squeeze a greater number of simultaneous users into a limited allocation of radio spectrum bandwidth creates complications regarding signal modulation and transmission. With closely spaced radio channels and high linearity requirements, cross-channel interference looms large. This potential for interference requires system designers to adopt signal transmission schemes that substantially limit spectral spreading or splatter between the different radio channels.

Simultaneously, users of these communication systems expect small, convenient communication devices that operate for long hours before requiring a battery recharge. In the quest to offer longer battery life, engineers eke out the maximum efficiency from each of the sub-systems within these communication devices. Almost nothing escapes the attention of these engineers as they strive to reduce device power consumption, from the power conversion and regulation circuits, to the audio input and output circuits. Because a preponderance of power typically goes to the radio frequency (RF) transmission portions of these communication devices, particularly to the RF power amplifier (PA) sections, engineers understandably devote much effort to increasing RF transmission efficiency.

In general, a RF power amplifier operates with varying efficiency across its range of operating modes, where efficiency is expressed as the ratio of output RF power to input power. Linear mode operation of the power amplifier exhibits lower efficiency than saturated mode operation but with the obvious benefit of linear signal amplification. Transmit signal linearity plays an important role in preserving signal fidelity and limiting cross-channel interference. Indeed, essentially all modern digital wireless communication standards, such as the TIA/EIA/IS-136, TIA/EIA/IS-95B, TIA/EIA/IS-2000, EDGE, W-CDMA air interface standards, require linear signal amplification.

Direct modulation of amplitude and phase (DMAP) techniques allow, in at least some configurations, a greater RF transmitter efficiency while preserving modulation linearity. Most digital modulation standards include both phase modulation information and amplitude modulation information. That is, the transmitted signal conveys desired transmit data using both phase (or frequency) and amplitude modulations. With DMAP, a processing system separates the phase modulation information from the amplitude modulation information. Generally, the phase modulation information comprises a constant-envelope signal used to phase modulate a RF carrier signal having the desired transmit signal frequency. This phase-modulated carrier signal is then envelope modulated using the corresponding amplitude modulation information.

BRIEF SUMMARY OF THE INVENTION

The present invention comprises systems and methods for avoiding phase discontinuity at the outset of RF signal generation. Such discontinuities might arise from phase control instabilities associated with start up or from abrupt changes in phase at the outset of signal generation. A transmitter in accordance with the present invention uses starting phase values in advance of using transmit data phase values to initialize phase modulation control circuits or functions. Once phase control is stabilized, and possibly after other criteria are met, the transmitter transitions from using starting phase values to using the transmit data phase values, so that a transmit signal begins carrying phase modulations associated with the desired transmit data. These phase modulation control techniques apply where transmitters employ direct phase modulation in RF signal generation, and may have particular applicability to burst-type RF transmitters, since such systems typically start and stop transmitting many times during normal operation.

A transmitter configured according to one or more exemplary embodiments of the present invention might use a digital processing system to generate a baseband information signal or signals reflecting desired transmit data. A transmit processor or other suitable circuitry then translates this baseband information signal into separate but coordinated phase and amplitude modulation information signals. These separate information signals are then used to phase and amplitude modulate, respectively, a RF transmit signal.

In at least some embodiments, a phase locked loop (PLL) or other phase modulator with some quantifiable start up or initialization requirements uses the phase modulation information signal to impart the desired phase modulation to the RF transmit signal responsive to the phase modulation information signal. By providing the phase modulator with starting phase values in advance of providing it with the phase modulation information signal, the start up or stabilization requirements of the phase modulator may be satisfied in advance of transmit signal generation. Once transition criteria are satisfied, which may involve timing or other parameters such as transmit signal amplitude, the transmitter transitions to providing the phase modulator with the transmit data phase values rather than with the starting phase value (i.e., it transitions to modulating the transmit signal with the phase modulation information signal according to the desired transmit data).

Further, by properly selecting or defining the starting phase value, the transmitter may avoid phase discontinuities in the RF transmit signal associated with transitioning to the desired transmit data phase values. This selection might entail setting the starting phase value to match the first or reference phase value of the transmit data phase values, for example.

Of course, those skilled in the art will recognize other features and advantages of the present invention upon reading the following detailed description, and upon reviewing the supporting drawing figures. For example, those skilled in the art will readily appreciate that many of the operations or functions associated with practicing the techniques of the present invention may be performed in hardware or software or by some combination thereof. Moreover, where hardware might be used, it will be obvious that most functions may be

DETAILED DESCRIPTION OF THE INVENTION

The present invention is concerned with, among other things, reducing spectral splatter arising from phase discontinuities or abrupt phase changes in a RF carrier signal at the outset of signal transmission. As such, the present invention finds broad applicability in a range of signal transmission scenarios. Techniques detailed herein are applicable to linear modulation techniques that employ direct modulation of phase and amplitude, and may be particularly valuable in burst or discontinuous signal transmission environments. For example, Enhanced data rates for GSM Evolution (EDGE) radio systems may use both linear 8-Phase shift keying (8-PSK) and non-linear Gaussian Minimum Shift Keying (GMSK) in a burst transmit environment. The present invention avoids undesirable phase instabilities that might otherwise arise with the use of direct phase modulation under these and other modulation schemes.

Indeed, GSM/EDGE provides an exemplary reference for discussing the present invention and serves as the basis for some of the detailed discussion that follows. However, it should be understood that the present invention is in no way limited to GSM/EDGE systems, and is in fact not limited to the field of wireless cellular communication systems.

Figure 1:
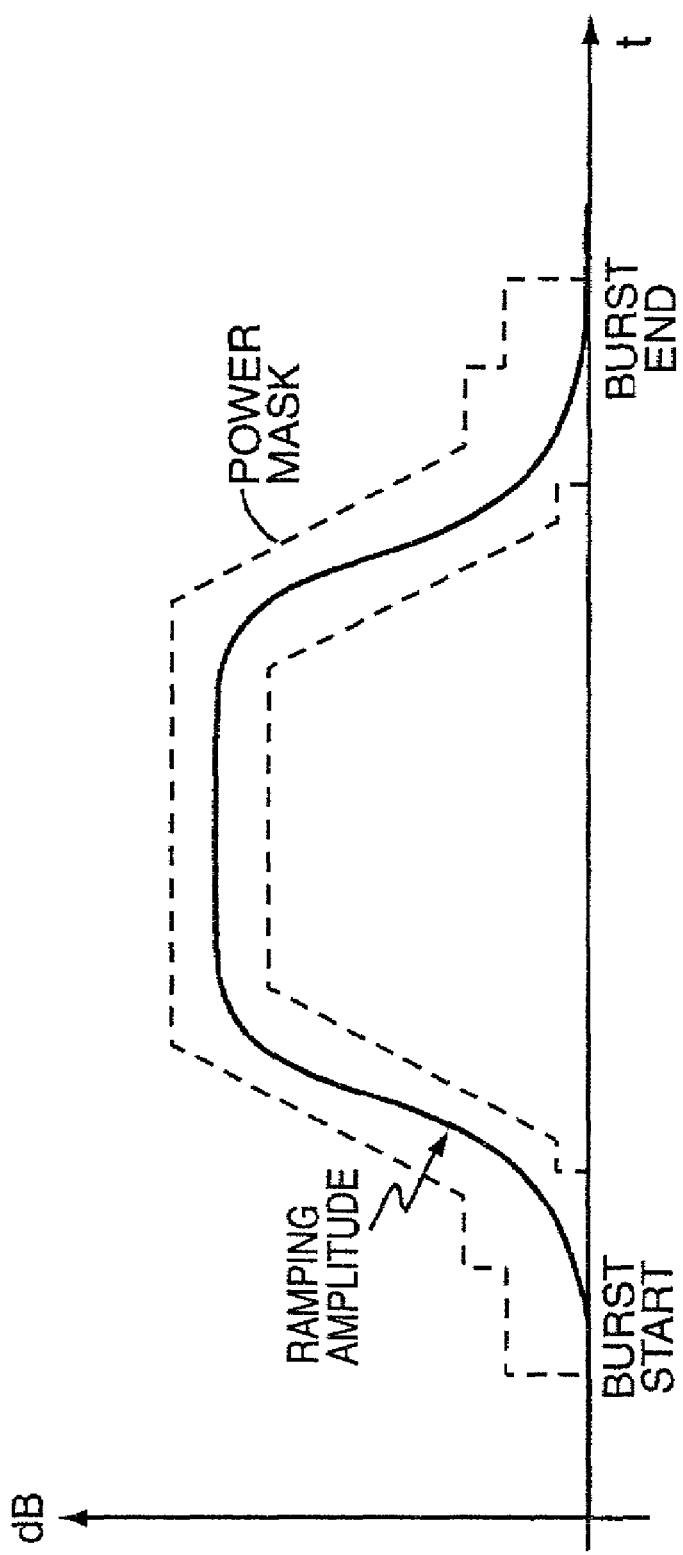
FIG. 1 is a diagram of a generalized radio frequency burst-type transmit signal.

Turning now to the drawings, FIG. 1 illustrates a generalized burst transmission by plotting the transmit power of a burst transmit signal over time. A burst start and a burst end bound the burst transmission. Notably, such burst transmissions are constrained by a number of concerns. For example, the burst transmission may be constrained by a power mask that defines a power envelope within which the RF transmit power must remain during the burst. In addition to power constraints, there typically are constraints on cross-channel interference or spectral splatter. With spectral splatter, the frequency spectrum of the transmitted signal exceeds the frequency channel boundaries associated with a currently assigned transmit channel. Thus, spectral splatter represents an interfering component for other frequency channels. As will be explained in more detail later, spectral splatter may be particularly likely at the outset of the transmit burst, depending on the modulation approach used.

In terms of modulation techniques, direct modulation of amplitude and phase (DMAP) used in transmit signal generation may offer a number of advantages. While enumeration of the possible advantages associated with DMAP is not necessary for understanding the present invention, it may be useful to note that DMAP can provide a more efficient and more cost-effective approach to RF transmit signal generation where linear modulation of the transmit signal is required. Signal modulation, as specified by EDGE and by other air interface standards (e.g., TIA/EIA/IS-136, TIA/EIA/IS-2000), requires linear transmit signal modulation. With many digital modulation techniques, the transmit signal conveys information via coordinated phase and amplitude modulations. Desired transmit data generally in the form of a digital bit stream are mapped into a series of defined symbols, with each symbol having a unique pairing of amplitude and phase. A radio frequency carrier signal is then modulated using the sequence of symbols generated from the desired transmit data. A compatible receiver receives and demodulates the transmitted signal to recover the transmitted symbol sequence, which sequence may then be decoded to recover the original transmit data bit stream.

Figures 2, 3:
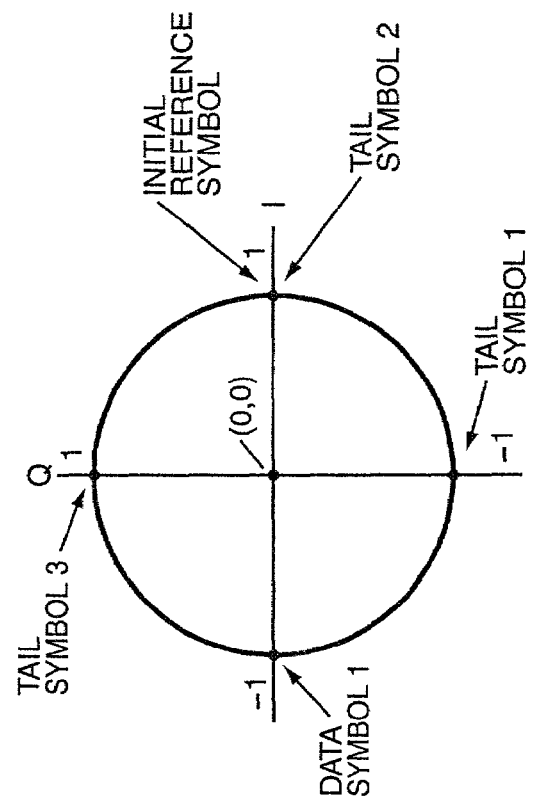
FIG. 2 is a diagram of a normal transmit burst structure in GSM.
FIG. 3 is a diagram of representative phase transitions at the start of transmit signal generation.

FIG. 2 illustrates the structure of a normal transmit burst in a GSM system. With GSM, as with other Time Division Multiple Access (TDMA) systems, a particular user is assigned one or more available time slots. That user transmits and receives data in time-multiplexed fashion on the assigned transmit and receive time slots. A normal transmit burst comprises a number of defined symbol groups. Each transmit burst is bounded at the burst start by three tail symbols and at the burst end by another three tail symbols. Intervening symbol groups convey both data and training information. The data symbols may be considered the burst's payload, while the training symbols allow a receiving system to perform equalization or channel compensation to correct for channel distortion.

With GSM, as with a number of other air interface standards, symbol phase information is conveyed through phase transitions in the transmit signal. Thus, referring back to FIG. 2, the sequence of symbols comprising a normal transmit burst may be thought of as representing a series of hard phase transitions from one symbol's phase value to the next. However, the desire to minimize spectral splatter places limits on the phase transition rate.

FIG. 3 illustrates idealized phase transitions plotted on the I and Q axes. Here, the points on the unit circle may be represented in terms of their Cartesian coordinates. Thus, a transmit burst may be demarcated by an initial reference symbol having a phase value of (1, 0) on the I and Q axes. Carrier phase then transitions to point (0, −1) for tail symbol one, and transitions back to (1, 0) for tail symbol 2. Carrier phase may then transition to coordinate position (0, 1) for tail symbol 3, thus completing the phase transitions associated with the three tail symbols at the beginning of the burst. The next series of phase transitions are associated with the first fifty-seven data symbols, and vary according to the particular data being transmitted.

Figure 4:
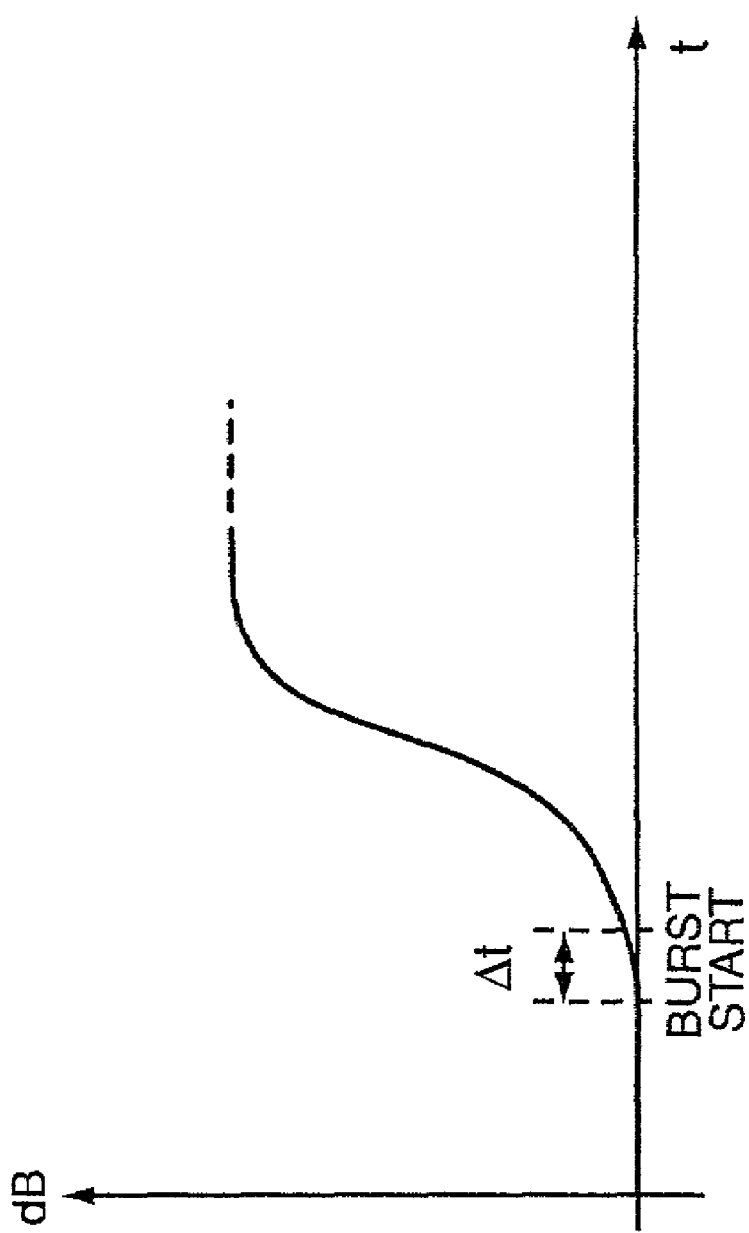
FIG. 4 is a diagram of exemplary amplitude ramping and pulse shaping filter lag at the start of transmit signal generation.

GSM/EDGE uses a pulse shaping filter to reduce the phase transition rate and thus limit unwanted frequency components in the transmit signal. One consequence of the pulse shaping filter is illustrated in FIG. 4. Because of filter lag, the transmit signal does not begin ramping up until a slight delay time $\Delta_t$ after the beginning of the burst. This initial delay may be thought of as a "filter lag."

One of the difficulties associated with DMAP involves avoiding undesirable phase discontinuities at the outset of signal transmission. Referring back to FIG. 1, one may see that the output signal amplitude begins ramping up essentially at the start of the transmit burst. Because transmit signal power ramps up rather quickly at the beginning of the burst, initial phase discontinuities in the transmit signal may cause unwanted frequency components in the transmit signal to be transmitted with appreciable signal power, resulting in undesirable interference.

Figure 5:
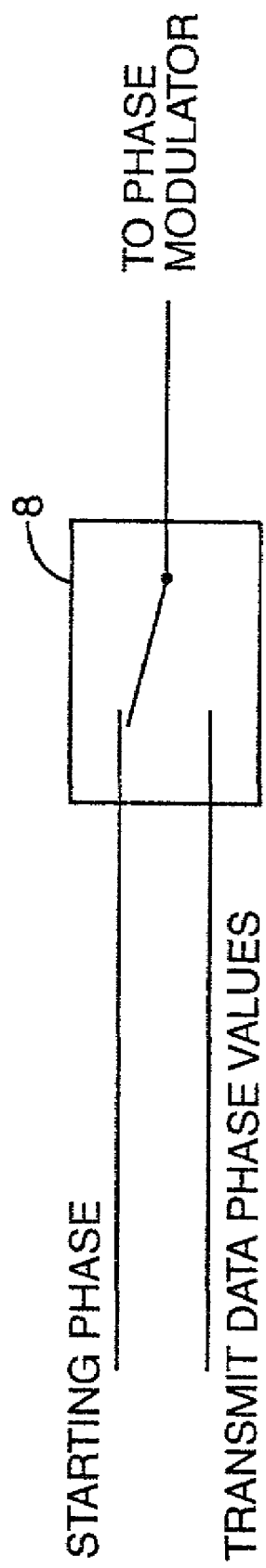
FIG. 5 is a diagram of an exemplary conceptual implementation of phase value source switching as practiced in the present invention.

FIG. 5 illustrates a conceptual approach to at least partly avoiding spectral splatter associated with phase discontinuity at the outset of signal transmission. A switch 8 is used to select between a starting phase value and the transmit data phase values (e.g., the transmit burst phase values). Initially a phase modulator (not shown) is provided with starting phase values, allowing it to initialize in advance of the burst start time when signal power is very low. Then, at or sometime after the burst start, switch 8 changes positions and begins providing the phase modulator with phase values derived from the desired transmit data.

As will be detailed later, the starting phase value supplied to the phase modulator by switch 8 may be chosen to match the phase value of an initial or reference phase value of the transmit burst phase values. In this manner, the phase modulator is initialized, and an abrupt phase change from the initialized phase value to the beginning transmit burst phase values is avoided.

Figure 6:
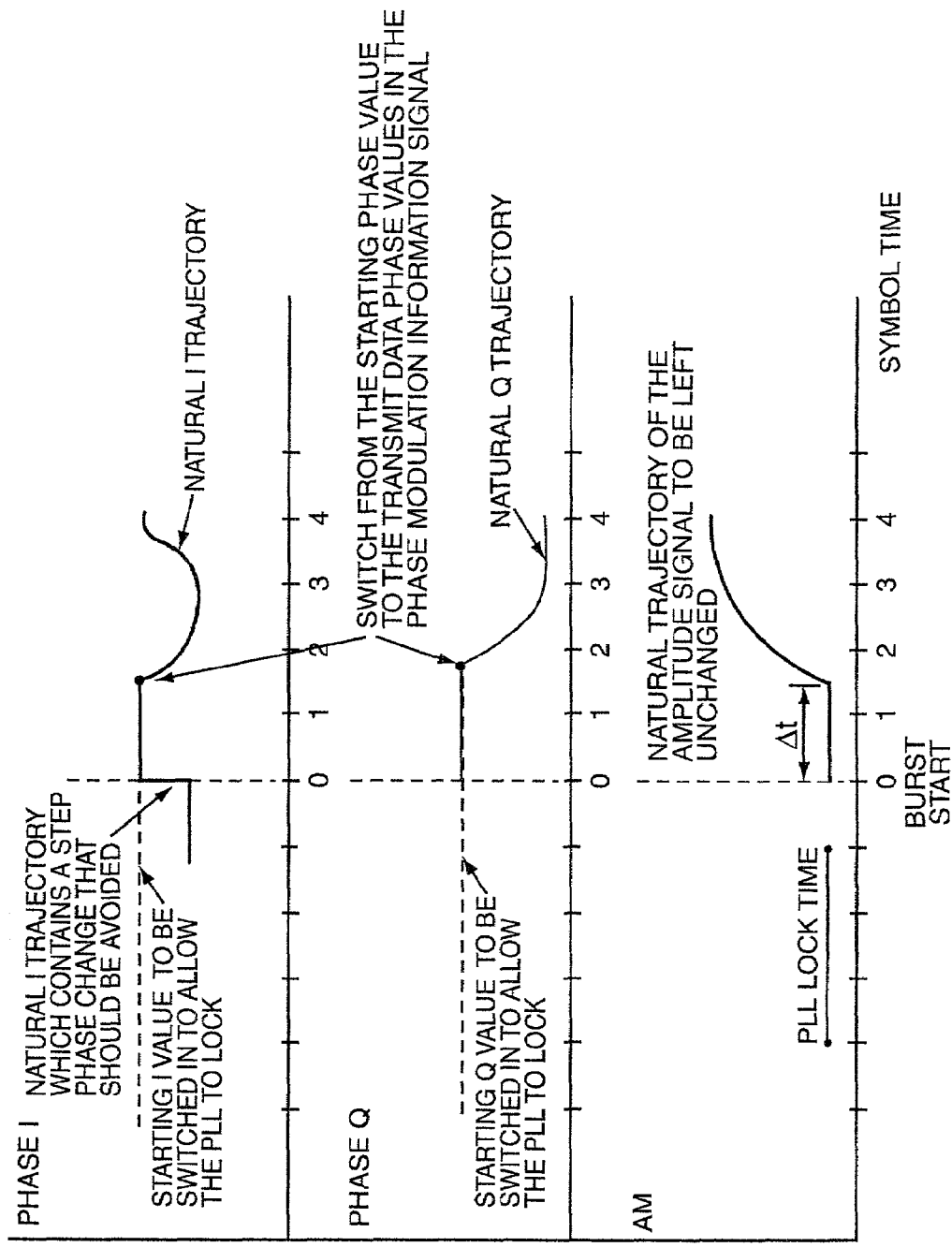
FIG. 6 is a diagram of exemplary phase and amplitude waveforms associated with practicing the present invention.

FIG. 6 illustrates this approach by plotting I and Q phase waveforms, along with an associated amplitude modulation (AM) waveform as a function of transmit symbol time. The solid lines for the I and Q phase waveforms represent natural phase trajectories, which might be expected absent practicing the techniques of the present invention. The dashed lines illustrate that sometime in advance of the burst start (at symbol time zero), the I and Q phase values are set to defined starting phase values, thereby allowing the phase modulator, which may be a phase locked loop (PLL) to stabilize to these initial I and Q phase values (i.e., achieve lock).

In general, the time required for the phase modulator to stabilize will determine how far in advance at a minimum it must be initialized. Also note that while the initial or starting phase values provided to the phase modulator may end at the burst start, the filter lag $\Delta_t$ may make it desirable to continue providing starting phase values to the phase modulator until the filter lag is overcome.

Figure 7:
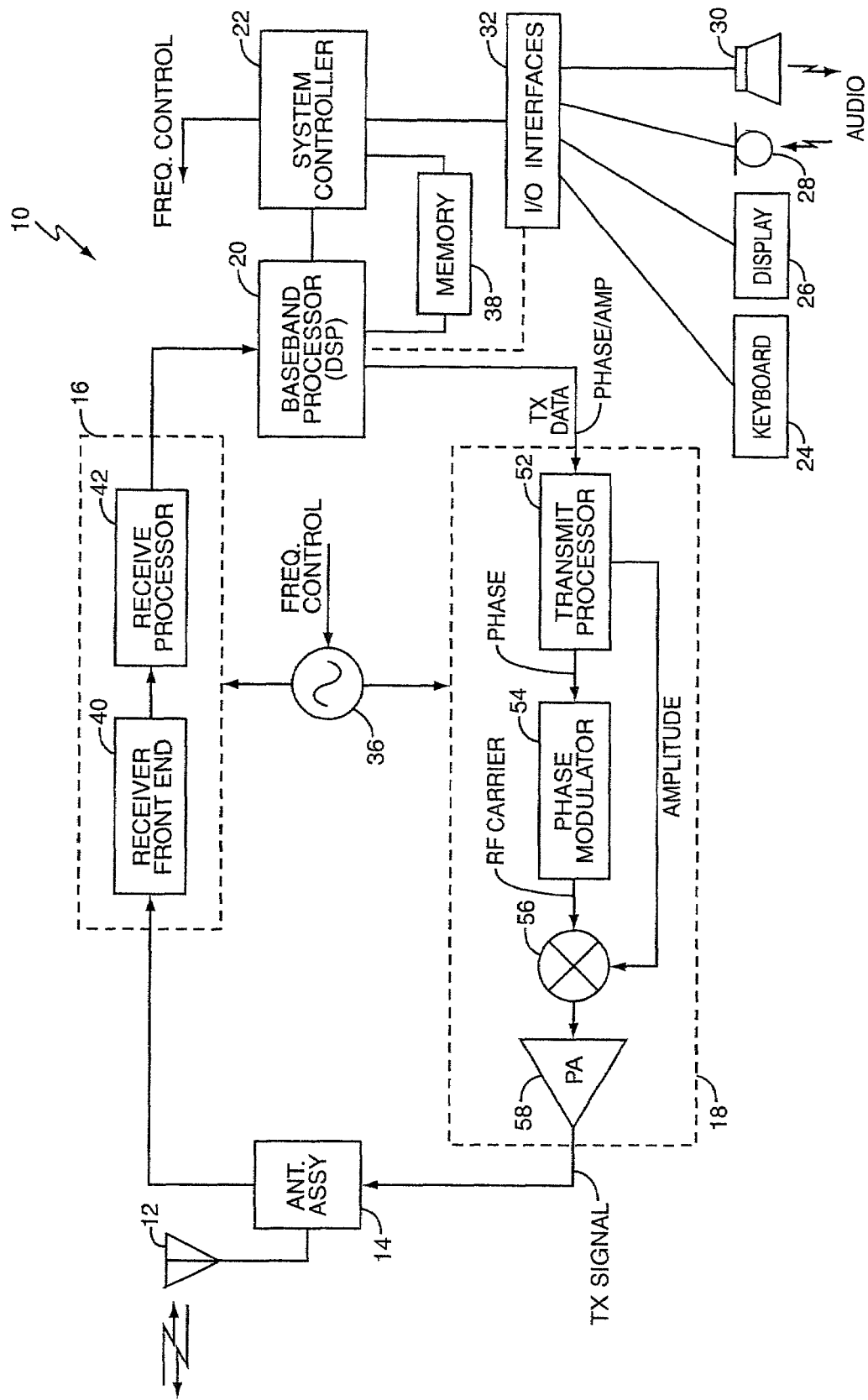
FIG. 7 is a diagram of an exemplary mobile terminal adapted to practicing the present invention.

FIG. 7 is an exemplary diagram of a mobile terminal 10 adapted in accordance with the present invention. Mobile terminal 10 receives and transmits RF signals through antenna 12, which is coupled to an antenna assembly 14. Antenna assembly 14 couples signals received through antenna 12 to a receiver 16, and couples the mobile terminal's RF transmit signal generated by a transmitter 18 to antenna 12. A baseband processor, which is typically a digital signal processor (DSP), interfaces with the receiver 16 and transmitter 18. A system controller 22 provides overall control and coordination of mobile terminal 10, and interfaces with a keypad 24, a display 26, a microphone 28, and a speaker 30.

Typically, one or more input/output (I/O) interfaces 32 provide the appropriate interfaces between the various peripherals (e.g., keypad 24, display 26, etc.) and the system controller 22. The I/O interfaces 32 typically comprise analog-to-digital converters (ADCs), digital-to-analog converters (DACs), level-shifting circuitry, audio amplifiers, and other circuits as needed or desired.

The controller 22 interfaces with the baseband processor 20, and provides it with certain control and configuration information. Further, the system controller 22 typically provides frequency control to a frequency synthesizer 36, which, in turn, provides one or more reference frequencies used by the receiver 16 and transmitter 18.

System software or program code for both the system controller 22 and the baseband processor are typically stored in one or more memory devices 38. Memory device(s) 38 may be shared or may be separately utilized by the system controller 22 and the baseband processor 20. Indeed, memory 38 may comprise not only physically separate memory devices, but may comprise a number of different types of memory, such as SRAM, DRAM, FLASH, EEPROM, etc.

SRAM and DRAM are typically used by the baseband processor 20 and the controller 22 during operation as scratch pad or working memory, and for variable data storage. Non-volatile memories, such as FLASH and EEPROM provide persistent storage of configuration information, program constants, and other long-term information. In the context of the present invention, starting phase information, and other variables, such as those used to control timing of the switch from starting phase values to transmit data phase values, may be stored in non-volatile memory. Alternatively, one or more of these parameters might be hard coded into system software running in the system controller 22, the baseband processor 20, or elsewhere in the mobile terminal 10.

As a receiver, mobile terminal 10 receives, demodulates, and decodes symbols transmitted from a remote transmitter. The receiver 16 includes a receiver front end 40, and a receive processor 42. The receiver front end 40 typically provides bandwidth filtering, conditioning or amplification, and analog to digital conversion. The receive processor 42 may comprise selected decoding circuits, and may include other baseband processing functions. Receive processor 42 may actually be integrated within baseband processor 20.

As a transmitter, the mobile terminal 10 generates a RF transmit signal, which is transmitted by the antenna 12. The transmit signal conveys desired transmit information via coordinated amplitude and phase modulations as discussed earlier. The process begins with the base band processor 20 providing raw transmit (TX) data to a transmit processor 52.

Transmit processor 52 may be thought of as a waveform generator. It converts the raw TX data into separate phase and amplitude modulation information signals. The phase modulation information drives a phase modulator 54, which uses the phase modulation information to modulate the phase of an RF carrier signal. The amplitude modulation information is used by amplitude modulator 56 to modulate the amplitude of the phase modulated RF carrier signal. Phase and amplitude modulations are synchronized to preserve the coherence between the separate phase and amplitude information derived from the raw TX data.

The phase and amplitude modulated RF carrier signal is input to a power amplifier 58, which generates the final RF transmit signal by providing appropriate power amplification for the modulated RF carrier signal. The antenna assembly 14 couples the transmit signal to antenna 12, from which it is radiated. It should be noted that the implementation of the transmitter 18 is subject to substantial variation. For example, power amplification of the modulated RF carrier signal may be configured such that the phase modulated RF carrier signal is provided as a constant envelope input signal to the power amplifier 58. The amplitude modulation information from the transmit processor 52 would then be used to vary the operating envelope of the power amplifier 58, thus imparting the desired amplitude modulation to the transmit signal.

Transmit processor 52 provides the phase modulator 54 with starting phase information in advance of the transmit signal start, so that the phase modulator 54 stabilizes to the starting phase value. At, or some time after, the beginning of signal transmission, the transmit processor 52 switches from providing the phase modulator 54 with starting phase information to providing it with transmit data phase values.

Figure 8:
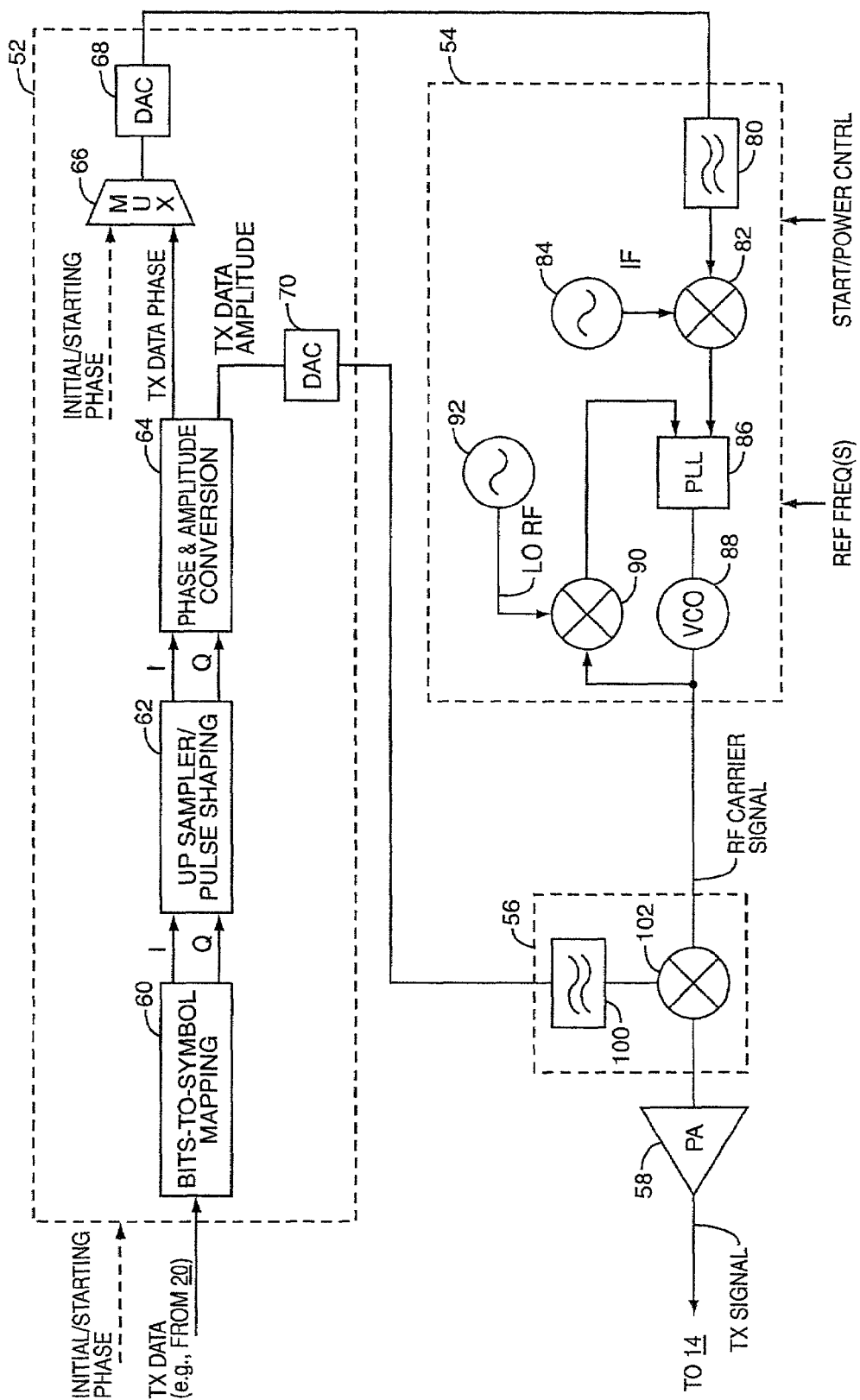
FIG. 8 is a diagram of exemplary transmitter details for the mobile terminal of FIG. 7.

FIG. 8 provides additional details for exemplary implementations of the transmit processor 52, phase modulator 54, and amplitude modulator 56. The transmit processor 52 comprises a symbol converter 60, an up sampler/pulse-shaper 62, a phase and amplitude converter 64, a multiplexer (mux) 66, and DACs 68 and 70. Here, the mux 66 represents an exemplary implementation of the conceptualized switch 8 depicted in FIG. 5.

In operation, the transmit processor 52 receives raw transmit data from, for example, the baseband processor 20. This raw transmit data is typically in the form of a digital bit stream. A transmit data signal path in the transmit processor 52 processes the input transmit data to form amplitude and phase modulation information signals. The signal path comprises at least the symbol converter 60, the up sampler/pulse shaper 62, and the amplitude and phase converter 64.

The symbol converter 60 groups the input bits, translating each group of input bits into one of a number of modulation symbols defined by the air interface standard employed by the mobile terminal 10. While this modulation symbol information is depicted in I/Q form, this discussion is directly applicable to other symbol mapping formats.

The up sampler/pulse shaper 62 provides up sampling and pulse shaping for the modulation symbol information, and provides the filtered symbol information to the phase and amplitude converter 64. The phase and amplitude converter 64 separates the symbol information into phase modulation information and amplitude modulation information signals. The phase modulation information associated with the transmit data then feeds into mux 66. The initial or starting phase information serves as a second input to the mux 66. Starting phase values may be locally available to the transmit processor 52 or may be externally provided, such as by the baseband processor 20 or the system controller 22.

By controlling the mux 66, the transmit processor 52 provides the phase modulator 54 with either starting phase values or transmit data phase values. In this manner, the transmit processor 52 may provide the phase modulator 54 with starting phase values in advance of transmit signal generation long enough to allow it to stabilize, and then switch over to providing it with transmit data phase values when desired.

The phase modulator 54 comprises an input filter 80, which may be a low pass filter, a modulator 82, which is driven at an intermediate frequency (IF) by an oscillator 84, a PLL 86, a voltage controlled oscillator (VCO) 88, a second modulator 90 in the feedback loop of the PLL 86, with the second modulator 90 driven by a second oscillator 92. Any reference frequencies used by the phase modulator 54 may be provided by the frequency synthesizer 36.

In operation, the VCO 88 generates the RF carrier signal at a desired carrier frequency and with a phase controlled by the PLL 86. The PLL 86 controls the phase of the RF carrier signal in accordance with input phase information received from the transmit processor 52. Thus, the starting phase value received from the transmit processor in advance of transmit signal generation sets the starting phase of the RF carrier signal.

At the start of transmit signal generation, such as at the start of a transmit burst, raw TX data is mapped to corresponding symbols, and then filtered by up sampler/pulse shaper 62. Once filtered symbol information begins flowing into the phase and amplitude converter 64, it begins outputting coordinated phase and amplitude modulation information signals. Thus, DAC 70 begins providing amplitude modulator 56 with an amplitude modulation control signal responsive to the amplitude modulation information signal.

Amplitude modulator 56 begins ramping up the RF carrier signal provided to the power amplifier 58 in accordance with the pulse shaping imposed by the up sampler and pulse shaper 62. The amplitude modulation control signal from DAC 70 passes through an input filter 100, which may be a low pass filter. The filtered control signal information is then used to control multiplier 102. Multiplier 102 effectively scales the RF carrier signal output by VCO 88 in accordance with the input amplitude modulation information, such that the RF carrier signal provided as an input to the power amplifier 58 is amplitude modulated in accordance with the symbol sequence representing the desired transmit data.

Figure 9:
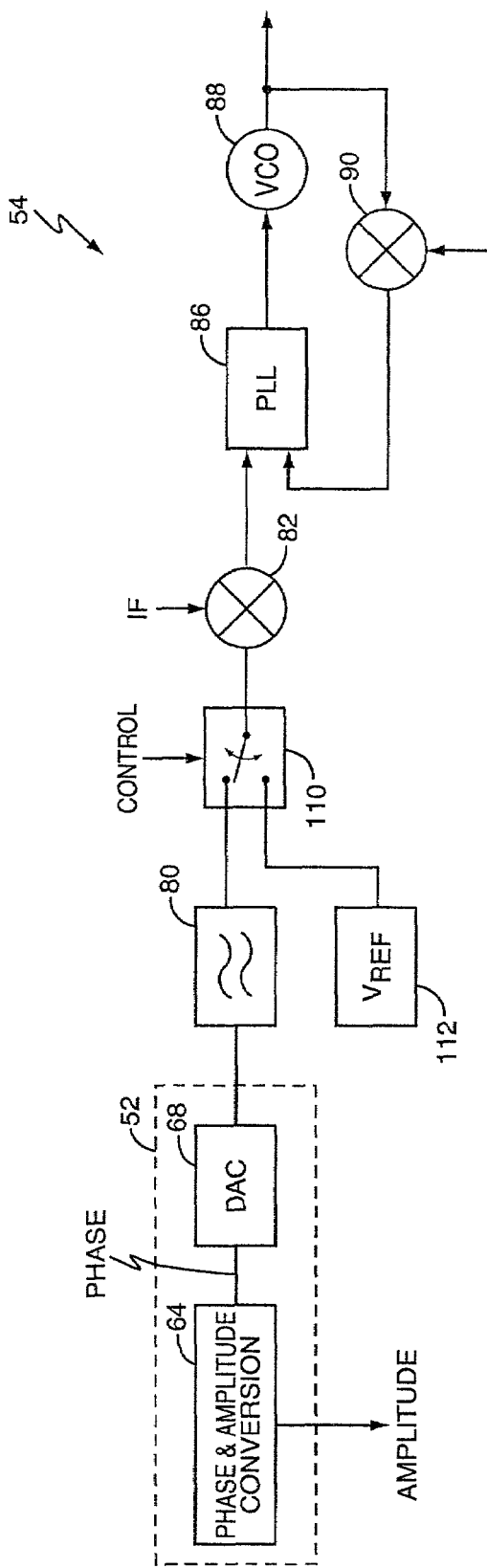
FIG. 9 is a diagram of an alternate, exemplary implementation for selected portions of the transmitter of FIG. 8.

FIG. 9 illustrates one of the many possible variations for providing starting phase values to the phase modulator 54. The configuration illustrated represents an analog-based approach to initializing the phase modulator 54. An analog switch 110 may be switched between starting phase values provided by a reference voltage source 112 and transmit data phase values provided by transmit processor 52. Thus, modulator 82 receives an input voltage representative of the desired phase for the carrier frequency signal that is either fixed at a voltage corresponding to the desired starting phase value, or that varies as a function of the desired transmit data. As will be readily appreciated by those skilled in the art, many variations are possible even in this analog implementation, and analog control may be based on voltage, current, or some other signal parameter that is varied in an analog fashion.

Figure 10:
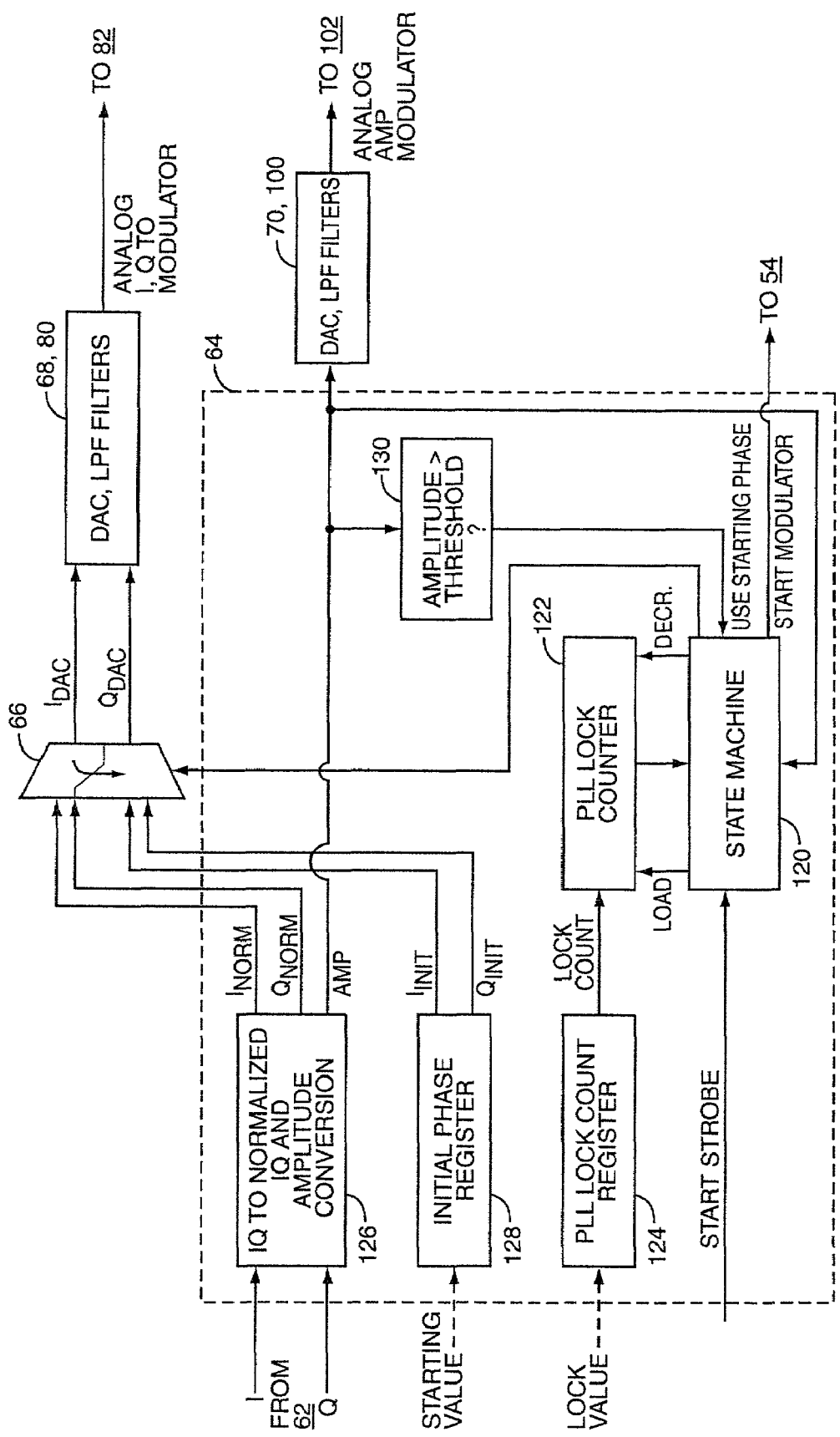
FIG. 10 is a diagram of exemplary details for the phase and amplitude converter used in the transmitter of FIG. 8.

FIG. 10 refers back to the implementation first illustrated in FIG. 8 and provides additional details for an exemplary phase and amplitude converter 64. A state machine or other control logic 120 determines whether the transmit processor 52 outputs starting phase values or transmit data phase values by controlling mux 66.

The state machine 120 may receive a starting signal such as a start strobe from the baseband processor 20, for example. In response, the state machine 120 starts a PLL lock counter 122, which may receive a starting lock count from a PLL lock count register 124. The lock count value may be hard coded based on the characteristics of the particular phase modulator 54 used, or may be configurable. In the latter case, the lock count register 124 may be loaded using an external lock value provided by the baseband processor 20, the controller 22, or some other device within the mobile terminal 10. The state machine 120 may provide an output control signal to the mux 66 that determines whether the mux 66 uses starting phase values or transmit data phase values.

Transmit data phase values are provided in normalized I/Q format to the mux 66 by the normalized I/Q and amplitude converter 126, which also provides transmit data amplitude modulation information. In other embodiments, normalized values may not be used, and phase information may not be represented in I/Q format.

Regardless of format, an initial phase register 128 may be configured to hold the desired starting phase value, which in the illustration is denoted as $I_{init}$ and $Q_{init}$. The values held in the initial phase register 128 may be hard coded or may be configurable. For example, the initial phase register 128 may be loaded with a desired starting phase value. Those skilled in the art will recognize that the configurability of the register values used by the phase and amplitude converter 64 allow easy adaptability to varying system conditions, or varying characteristics or implementations of the phase modulator 54.

As discussed earlier, the phase and amplitude converter 64 may continue supplying the phase modulator 54 with the starting phase value even after the burst start. This may be advantageous for accommodating filter lag, and may have other advantages. One approach to determining when to switch from providing the phase modulator 54 with starting phase values to desired transmit data phase values involves the use of a threshold detector 130.

Using threshold detector 130, the mux 66 is switched from starting phase values to transmit data phase values when the ramping amplitude of the transmit burst signal reaches a defined threshold value. Of course this threshold value may be configured in accordance with the particular needs of a given transmit signal type, but in general this approach allows the phase modulator 54 to be maintained at a stable known starting phase value until filter lag or other startup delays are overcome. It should be understood that detecting the amplitude threshold of the transmit signal may imply detecting it directly or indirectly. The illustrated embodiment represents an example of threshold detection based on monitoring the amplitude information signal used to amplitude modulate the transmit signal.

The state machine 120 may also provide the phase modulator 54 with a start signal. In the interest of power savings, the phase modulator 54 may be powered down between periods of transmit signal generation. Thus, for example, in advance of a transmit burst, the state machine 120 may provide a start signal to the phase modulator 54 and in addition may provide it with starting phase values. This action by the state machine 120 allows the phase modulator 54 to power up and stabilize to the starting phase value in advance of actual transmit signal generation.

As mentioned earlier, the starting phase value provided to the phase modulator 54 may be chosen to match the initial or default starting phase value of the first symbol phase or symbol phase transition of the transmit data. Thus, the starting phase value provided to the phase modulator 54 may be chosen to match the starting phase of a reference or tail symbol defining the beginning of a transmit burst in GSM. Of course, the same matching concept may be readily extended to other air interface standards, and other transmit signal generation techniques.

Choosing the starting phase value supplied by the mux 66 to the phase modulator 54 to match the first one or ones of the transmit data phase values conveyed by phase modulation information signal may be particularly advantageous in light of where the mux 66 is positioned. With mux 66 positioned after the up sampler/pulse shaper 62, the starting phase values provided by the mux 66 are not subject to the pulse shaping filter applied to the transmit data phase values. While the phase modulator does have input filtering, it may still be desirable to reduce or eliminate rapid phase changes that might otherwise arising from the switching action of the mux 66 from the starting phase value to the actual transmit data phase values.

Figure 11:
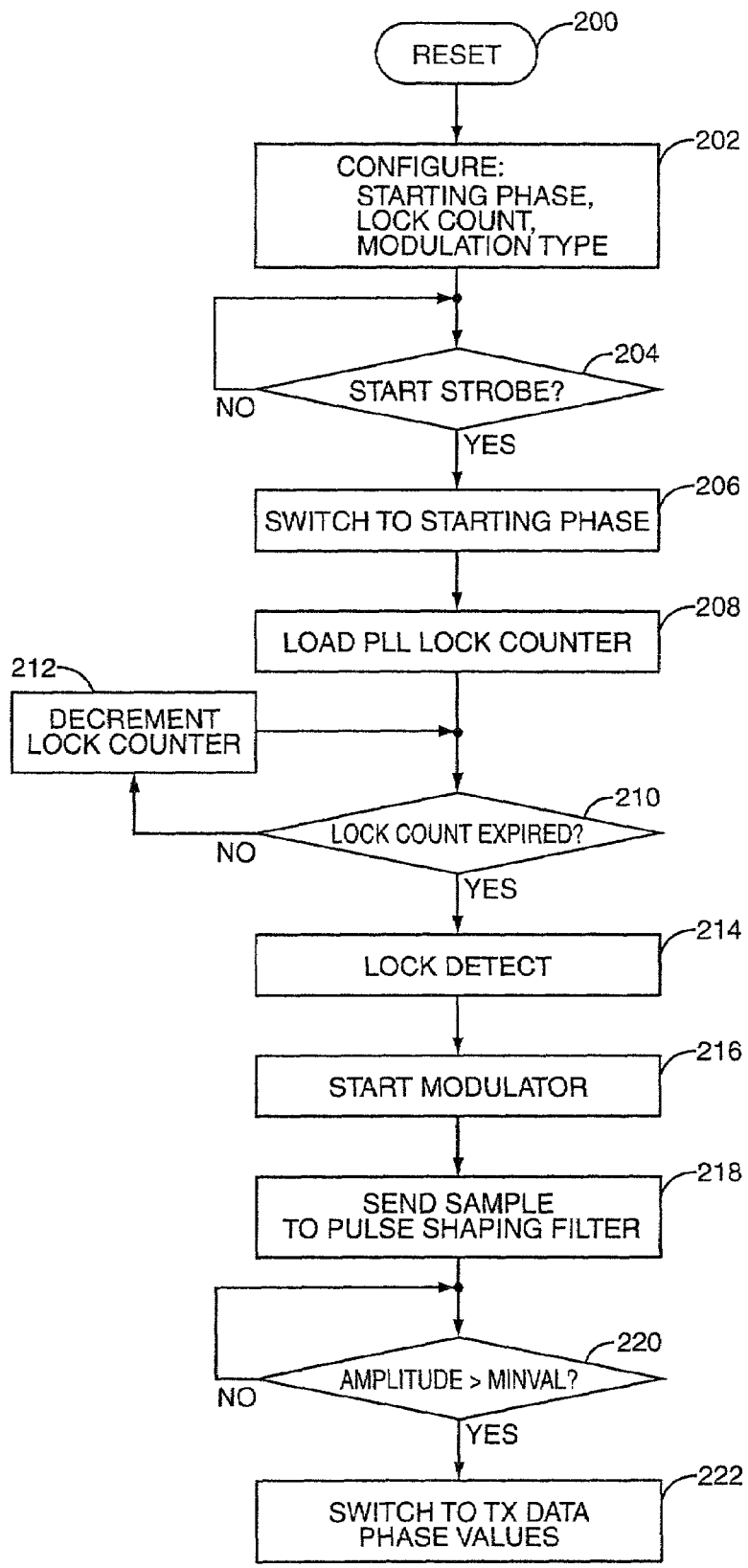
FIG. 11 is a logic flow diagram of exemplary phase control logic in accordance with one embodiment of the present invention.

FIG. 11 illustrates exemplary flow logic associated with the implementation illustrated in FIG. 10. Processing begins at reset (step 200) with configuration of the starting phase value, lock count, and modulation type (step 202). Processing then idles waiting for a start strobe or other indication of a transmit burst start (step 204). Note that the start strobe may proceed the actual burst start time, thus allowing for desired initialization of the phase modulator 54. Upon receipt of the start strobe, processing continues with switching the mux 66 to the starting phase value (step 206), and loading the PLL lock counter with the starting lock count (step 208). Processing continues with checking and decrementing the PLL lock counter (steps 210 and 212). Once the lock counter is satisfied, processing continues with optional lock detection procedures (step 214). Mobile terminal 10 may incorporate other lock detection safeguards to prevent continued operation in the presence of PLL lock failures.

Processing then continues with the phase and amplitude converter 64 starting the phase modulator 54 (step 216), which generally may be accomplished by providing a start signal or start indicator to the phase modulator 54. Symbol converter 60 then begins sending samples to the pulse shaper 62 (step 218), which causes amplitude modulation information to begin being generated. Processing then loops based on checking the amplitude of the transmit signal or by checking, for example, the values of the amplitude information being provided to the DAC 70 by the phase and amplitude converter 64 (step 220).

Once the threshold detector 130 determines that the ramping amplitude of the transmit signal has reached a minimum defined value, the phase and amplitude converter 64 switches from providing the phase modulator 54 with the starting phase value to providing it with the transmit data phase values.

While those skilled in the art may already appreciate the broad applicability of the present invention with regards to transmit signal generation, it should be noted that while the present invention was illustrated in the foregoing description in the framework of a mobile terminal 10, it may be applied across a variety of transmitter embodiments.

Figure 12:
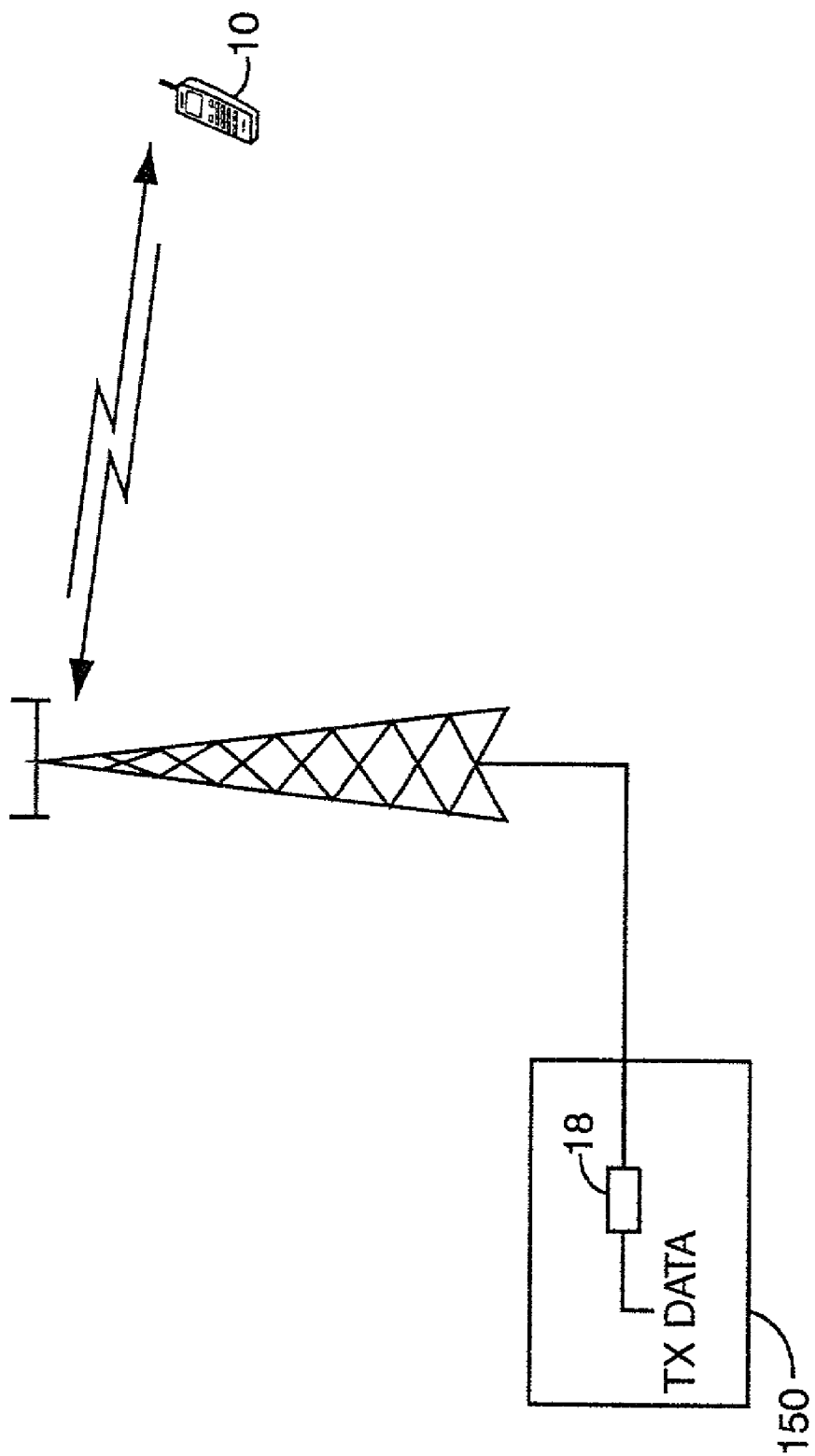
FIG. 12 is a diagram of the transmitter of FIG. 8 adapted for use in a radio base station.

Thus, the transmitter 18 may be adapted for a variety of uses. In some embodiments, the transmitter 18 may be adapted for use in radio base stations 150, or other wireless communication network transmitters, as is illustrated in FIG. 12. Indeed, the techniques and apparatus of the present invention find useful application essentially anywhere that direct phase modulation is used in transmit signal generation. Thus, the present invention is not limited by the discussion above rather it is limited only by the scope of the following claims and the reasonable equivalence thereof.

What is claimed is:

1. A method of generating a transmit signal, the method comprising:
    generating transmit signal phase and amplitude modulation information from desired transmit data;
    modulating the phase of a RF carrier signal by providing the transmit signal phase modulation information to a data input of a phase modulator;
    modulating the amplitude of the RF carrier signal by providing the transmit signal amplitude modulation information to an amplitude modulator; and
    initializing the phase of the RF carrier signal by providing a starting phase value to the data input of the phase modulator in advance of providing the transmit signal phase modulation information to the data input of the phase modulator to reduce initial phase discontinuity in the transmit signal.

2. The method of claim 1 further comprising choosing said starting phase value to match an initial value of the transmit signal phase modulation information.

3. The method of claim 2 wherein the transmit signal is a burst transmit signal, and wherein choosing said starting phase value to match an initial value of the transmit signal phase modulation information comprises choosing a reference phase value that prefaces said burst transmit signal as said starting phase value.

4. The method of claim 1 wherein the transmit signal is a burst transmit signal having a ramping amplitude at a beginning of said burst, and further comprising maintaining the phase of the RF carrier signal at said starting phase value until reaching a defined amplitude threshold.

5. The method of claim 1 further comprising initializing said phase modulator using said starting phase value in advance of generating said transmit signal.

6. The method of claim 5 wherein said phase modulator comprises a phase locked loop (PLL), and wherein initializing said phase modulator using said starting phase value comprises allowing said PLL to lock onto said starting phase value.

7. The method of claim 6 wherein said transmit signal is a burst transmit signal having a defined burst start time, and further comprising setting a time to begin initializing said PLL in advance of said burst start time.

8. The method of claim 7 further comprising setting a time to transition from providing said PLL with said starting phase value to providing said PLL with the transmit signal phase modulation information based on an amplitude ramp associated with said burst transmit signal.

9. A transmitter employing direct modulation of phase and amplitude to generate a RF transmit signal, the transmitter comprising: a transmit processor to receive desired transmit data and translate said desired transmit data into corresponding phase and amplitude modulation information signals;
a phase modulator to modulate the phase of said RF transmit signal responsive to an input phase modulation signal;
an amplitude modulator to modulate an amplitude of said RF transmit signal responsive to said amplitude modulation information signal; and
a switch associated with said transmit processor to selectively provide a starting phase value or said phase modulation information signal as said input phase modulation signal to said phase modulator.

10. The transmitter of claim 9 further comprising a power amplifier to provide power amplification for said RF transmit signal.

11. The transmitter of claim 9 wherein said transmit processor comprises a transmit data signal path to process said desired transmit data to create said amplitude and phase modulation information signals.

12. The transmitter of claim 11 wherein said switch is positioned after said transmit data signal path, and selectively couples said phase modulation information signal output from said transmit data signal path to said phase modulator.

13. The transmitter of claim 12 wherein said transmit data signal path comprises a filter to limit a rate of phase transitions in said phase modulation information signal.

14. The transmitter of claim 13 wherein said transmitter sets said starting phase value to match an initial phase value of said phase modulation information signal to reduce phase discontinuity arising from said switching between said starting phase value and said phase modulation information signal.

15. The transmitter of claim 9 wherein said transmit processor comprises a lock counter to implement a counting function used in timing a minimum period for providing said phase modulator with said starting phase value.

16. The transmitter of claim 15 wherein said transmit processor further comprises a state machine to control said switch responsive at least in part to said lock counter.

17. The transmitter of claim 16 wherein said transmitter further comprises a threshold detector to detect an amplitude threshold associated with a start of said RF transmit signal, and wherein said state machine further controls said switch responsive to threshold detection signal from said threshold detector.

18. The transmitter of claim 15 wherein said transmitter further comprises a lock count register to store a lock count value used by said lock counter.

19. The transmitter of claim 9 wherein said transmit processor comprises a logic register to store said starting phase value.

20. The transmitter of claim 9 wherein said transmit processor provides a power control signal to said phase modulator to start and stop said phase modulator between RF transmit generation cycles.

21. A mobile terminal operative to generate a transmit signal for conveying desired transmit information, said mobile terminal comprising:
a transmit circuit to generate the transmit signal by modulating the phase and amplitude of a RF carrier signal in accordance with input phase and amplitude modulation information; and
a processor to generate said input phase and amplitude information based on said desired transmit information;
said processor further operative to initialize said transmit circuit by providing a starting phase value to said phase modulator as said input phase information in advance of providing said input phase information associated with said desired transmit information.

22. The mobile terminal of claim 21 wherein said transmit circuit comprises:
a phase modulator to modulate the phase of the RF carrier signal based on said input phase modulation information; and
an amplitude modulator to modulate the amplitude of the RF carrier based on said amplitude modulation information;
said starting phase value from said processor operative to initialize said phase modulator by configuring said phase modulator to impart a known starting phase to the RF carrier signal.

23. The mobile terminal of claim 21 wherein said known starting phase of said RF carrier signal matches an initial phase value of said input phase information generated by said processor from said desired transmit information.

24. The mobile terminal of claim 21 wherein said transmit circuit and said processor comprise a burst transmitter operative to transmit said desired transmit information in transmit bursts, and wherein each said transmit burst comprises a burst start and a burst end.

25. The mobile terminal of claim 24 wherein said transmit circuit comprises a phase modulator, and wherein said processor provides said starting phase value to said phase modulator in advance of said burst start, such that said phase modulator stabilizes before said burst start.

26. The mobile terminal of claim 25 wherein said processor switches from providing said phase modulator with said starting phase value to providing said phase modulator with phase values derived from said desired transmit information.

27. The mobile terminal of claim 26 wherein said processor performs said switch from said starting phase value to said phase value derived from said desired transmit information at said burst start.

28. The mobile terminal of claim 26 wherein said processor performs said switch from said starting phase value to said phase value derived from said desired transmit information at a defined point in time after said burst start.

29. The mobile terminal of claim 28 wherein said processor determines said defined point in time based on an amplitude ramp of said transmit burst.

30. The mobile terminal of claim 21 wherein said mobile terminal comprises a cellular radio terminal.

31. The mobile terminal of claim 21 wherein said mobile terminal comprises a GSM radiotelephone, and wherein said mobile terminal generates said transmit signal as one or more transmit bursts in accordance with GSM standards.

32. The mobile terminal of claim 21 wherein said mobile terminal comprises an EDGE radiotelephone, and wherein said mobile terminal generates said transmit signal in accordance with EDGE standards.

33. The mobile terminal of claim 21 wherein said mobile terminal comprises a cellular radio telephone adapted to use said phase and amplitude modulators in generating a linearly modulated transmit signal.

34. The mobile terminal of claim 21 wherein said processor selects said starting phase value to match an initial phase value of said input phase information associated with said desired transmit information to reduce phase discontinuity in said transmit signal.

* * * * *